United States Patent [19]

Bears

[11] Patent Number: 5,349,457
[45] Date of Patent: * Sep. 20, 1994

[54] FIBER OPTIC TELEPHONE LOOP NETWORK

[75] Inventor: James A. Bears, Osgoode, Canada

[73] Assignee: Northern Telecom Limited, Montreal, Canada

[ * ] Notice: The portion of the term of this patent subsequent to Jun. 28, 2011 has been disclaimed.

[21] Appl. No.: 10,243

[22] Filed: Jan. 28, 1993

Related U.S. Application Data

[63] Continuation-in-part of Ser. No. 810,067, Dec. 19, 1991.

[30] Foreign Application Priority Data

Feb. 4, 1992 [GB] United Kingdom ............ 9202353.0

[51] Int. Cl.$^5$ ............................................. H04J 14/00
[52] U.S. Cl. .................................. 359/118; 359/126; 359/137
[58] Field of Search ............... 359/118, 119, 121, 126, 359/110, 161, 177, 137, 125; 358/84, 86; 455/3.1, 4.1, 4.2, 5.1

[56] References Cited

U.S. PATENT DOCUMENTS

| | | | |
|---|---|---|---|
| 4,491,983 | 1/1985 | Pinnow et al. | 359/118 |
| 4,686,667 | 8/1987 | Ohnsorge | 359/118 |
| 4,709,418 | 11/1987 | Fox et al. | 359/118 |
| 4,878,049 | 10/1989 | Ochiai | 359/110 |
| 4,891,694 | 1/1990 | Way | 359/125 |
| 5,136,411 | 8/1992 | Paik et al. | 359/125 |

FOREIGN PATENT DOCUMENTS

| | | | |
|---|---|---|---|
| 0425871 | 5/1991 | European Pat. Off. . | |
| 9109478 | 6/1991 | World Int. Prop. O. | 359/125 |

OTHER PUBLICATIONS

M. Shimoidara et al, "Optical Technology for ISDN User Access", NEC Research & Development, Special Issue on ISDN, 1987, pp. 68–77.

R. A. Schiffler et al, "An Alternative Interim Solution on the Road to BISDN", Conf. Record, IEEE Int'l Conf. on Communications, 14–19 Apr. 1990, vol. 4, pp. 1–4.

T. Hasegawa et al, "Optical Customer Access Based on Digital Loop Carrier", Conf. Record, IEEE Int'l Conf. on Communications, 14–19 Apr. 1990, vol. 4, pp. 1550–1554.

J. D. Jensen et al, "Fiber to the Pedestal . . . Then What?", Conf. Record, IEEE Int'l Conf. on Communications, 15–19 Apr. 1990, vol. 4, pp. 32–34.

S. Pendleton-Hughes et al, "Forty Channel Wavelength Multiplexing for Short Haul Wideband Communication Networks", Tech. Digest, 11th European Conf. on Optical Communication, 1–4 Oct. 1985, vol. 1, pp. 649–652.

L. Bersiner et al, "Bidirectional WDM Transmission with Spectrum Sliced LEDs", Journal of Optical Communications, vol. 11, No. 2, Jun. 1990, entire document.

N. C. Hightower, "Economic FO System for New Residential Services", Telephony, Mar. 17, 1986, pp. 44–56.

C. Nelson, "What Cost Local Loop?", Telephony, Oct. 29, 1990, pp. 38–42.

C. T. Hawley, "Break On Through to the Other Side", Telephony, Jan. 14, 1991, pp. 38–48.

J. S. McConnell, "To PON or Not To Pon? That is the Question", Telephony, Jan. 14, 1991, pp. 50–56.

*Primary Examiner*—Leslie Pascal
*Attorney, Agent, or Firm*—Yoshiharu Toyooka

[57] ABSTRACT

Novel fiber optic telephone loop networks are disclosed. In the networks, single mode fiber optics are used for feeder and distribution segments of the loop but multimode fiber optics are used for the drops. The use of the multimode fiber optics has permitted the use of less costly optoelectronic devices. Surface light emitting diodes are such economical but reliable parts. Fiber service terminals located near subscriber premises convert single mode operation to the multimode operation. The networks are relatively easy to install and upgrade and are very economically competitive with other known FTTC and FTTH schemes. In a further embodiment, the fiber service terminals have microprocessor control to reroute signals via redundant single mode connections to central switching office in the event of a fault in a single mode fibers.

2 Claims, 7 Drawing Sheets

FIBER OPTIC TELEPHONE LOOP NETWORK

This is a continuation-in-part of U.S. patent application Ser. No. 07/810,067 filed Dec. 19, 1991 in the name of James A. Bears and entitled "Fiber Optic Telephone Loop Network". The entire disclosure of this parent application is hereby incorporated herein by reference.

FIELD OF THE INVENTION

This invention is directed generally to a novel telephone loop network. In particular, it is directed to a telephone loop network in which single mode optic fibers and multimode optic fibers are used at specific segments of the telephone loop. Together with the use of more economical outside plant elements, the invention realizes a cost effective fiber-in-the-loop deployment which also possesses a good future upgrading capability of the communication services. The invention also realizes network systems which have a good survivability against faults due to accident or other cause.

BACKGROUND OF THE INVENTION

The fiber optic transmission technology has matured from its embryonic field trial status to the position of market where now it dominates in the long-haul transmission arena. The fiber optic has recently penetrated into the feeder portion of the local loop. This technological evolution is continuing into the distribution portion of the loop and then further into the drops to individual homes. The primary reason for this change is that fiber optics has become the most economical way to meet customer needs.

As discussed in "What Cost Local Loop?" by C. Nelson in Telephony, Oct. 29, 1990, pp 38–42, there are many factors to consider when comparing the economics of copper and fiber in the loop. Although the installed first cost of fully loaded systems is probably the single most visible factor, other variables such as depreciation, maintenance costs and the ability to provide service to initial residents-while deferring the cost of providing service to future residents-can have major effects on the economics of the competing systems. These life-cycle costs are the most difficult to analyze because they vary so dramatically based on the specifics of the neighbourhood under consideration.

The telephone companies at the same time must face another problem of providing cost-effective POTS (plain old telephone service) today using a system that will be able to carry tomorrow's enhanced services. Any FITL (fiber-in-the-loop) system deployed today must have this capability. Thus Bellcore (Bell Communications Research Ltd) lists the three key requirements of such a system. First, it must have only two fibers per pedestal. Second, the upgrade plan must provide for the simultaneous transmission of telephony, AM video and broadband integrated services digital network (BISDN) offerings in any mix at the pedestal. Finally, upgrading one subscriber interface unit should not affect customer service at other subscriber interface units.

Single-mode optical fibers are the future of the telephone loop and have been exclusively used in various portions of the loop. They are relatively robust, economical and have bandwidth capacity that far exceeds today's copper pairs. But placing fiber in the loop also presents significant technical challenges for telecommunications equipment suppliers and telephone company planners in the areas of cost, power, operations and architecture. The choices made in each of these areas will affect decisions in the others, which adds to the challenge. (See "Break On Through To The Other Side" by C. T. Hawley, Telephony Jan. 14, 1991, pp 38–48)

Telephone company planners continue to struggle with the placement of fiber in the distribution plant even though, as stated earlier, fiber optic networks can provide increased bandwidth, superior signal quality, greater immunity to electromagnetic interference and reduced maintenance when compared with their copper-based counterparts. It is discussed in "To PON or Not To PON? That is The Question" by J. S. McConnell, Telephony, Jan. 14, 1991, pp 50–56 that traditional approaches for placing fiber in the distribution plant vs. the copper cable alternative have not proven economically feasible.

In summary, as stated in the article by Hawley, telephone companies need an FITL architecture that supports current services and operations and provides an evolutionary path from a copper-dominated loop to an all-fiber loop. It must lead to the deployment of fiber in a way that conserves near-term capital resources and provides a fiber disposition in the loop that will allow a stream of new services to be provided with minimal rearrangements. It must gracefully integrate the loop into a survivable national synchronous optical network. The right architecture will allow the evolution of operations support to new generations of mechanized support systems in an increasingly intelligent and flexible network. It is also very important that the loop network should be as immune as possible to accident or the like which may cause faults in the network or the network must have a good survivability against such accidents. The present invention proposes a novel way of integrating fiber network into the loop and achieves these objectives.

OBJECTS OF THE INVENTION

It is therefore an object of the present invention to provide an optic fiber telephone loop network which is economical to implement without disrupting existing services.

It is another object of the present invention to provide an optic fiber telephone loop network which is easier and more economical to upgrade.

It is a further object of the present invention to provide an optic fiber telephone loop network which has a good survivability against faults which may develop in the network.

SUMMARY OF THE INVENTION

Briefly stated the present invention is directed to a novel telephone loop network which connects a central switching office and a plurality of subscriber premises. The loop network comprises a remote fiber terminal and a plurality of FST means. The remote fiber terminal is located at the central switching office and includes multiplexer/demultiplexer means for converting electrical signals from the central switch to muliplexed optical signals and vice versa. Each of the FSTs is located substantially near a group of the plurality of subscriber premises and includes multiplexer/demultiplexer means for converting the multiplexed optical signals to demultiplexed home optical signals and vice versa. The network includes single mode fiber optic feeder cables which connect the remote fiber terminal and the plurality of FST means for transmitting the multiplexed optical signals to each of the FST means. The network further has multimode fiber optic drops each connecting one of the plurality of FST means with one of the plurality of subscriber premises for transmitting the demultiplexed home optical signals to the subscriber premises. House optical terminal means are included in the network and are each located at the subscriber premise and include an individual line card or cards for converting the demultiplexed home optical signals to home electrical signals for use within said subscriber premises and vice versa.

According to another aspect of the present invention there is provided a telephone loop network connecting a central switching office (CSO) and a plurality of subscriber premises. The network includes a remote fiber terminal (RFT) located at the central switching office including multiplexer/demultiplexer (MUX/DEMUX) means for converting electrical signals from the CSO to multiplexed optical signals for the network and vice versa and a plurality of fiber service terminal (FST) means each located substantially near a group of the subscriber premises. In the network single mode fiber optical feeder cables connect the RFT with a plurality of FST means for transmitting multiplexed optical signals to each of the FST means, each FST means including multiplexer/demultiplexer means for converting the multiplexed optical signals to demultiplexed home optical signals and vice versa. Multimode fiber optic drops are provided, each connecting one of the FST means with one of a group of subscriber premises for transmitting demultiplexed home optical signals between the FST means and individual subscriber premises. House optical terminal means are located in individual subscriber premises and include individual line card or cards for converting demultiplexed home optical signals to home electrical signals for use within subscriber premises and vice versa. The network further has for each FST means at least two separate single mode feeder cables connecting with respective separate RFTs at the CSO, each feeder cable having separate go and return paths, and in each FST means interface switching means for connecting the FST MUX/DEMUX means with one or other of the feeder cables whereby in the event of a fault developing in either feeder cable at least one go and one return path remain effective between the FST and the CSO.

BRIEF DESCRIPTION OF THE DRAWINGS

For a more complete understanding of the present invention and for further objects and advantages thereof, reference may now be made to the following description, taken in conjunction with the accompanying drawings, in which.

DETAILED DESCRIPTION OF THE PREFERRED EMBODIMENTS OF THE INVENTION

Figure 1:
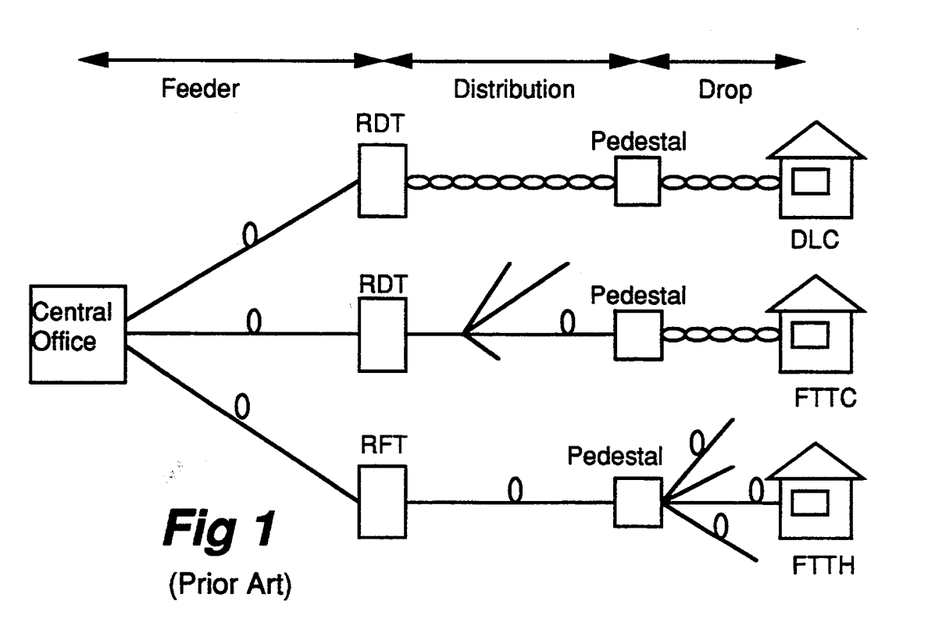
FIG. 1 is a schematic diagram of popular prior art fiber-in-the-loop system architecture.

In FIG. 1, there are shown popular fiber-in-the-loop (FITL) system architectures widely being experimented today.

The digital loop carrier (DLC) system uses electronic multiplexing techniques to share a single mode optical fiber in the feeder portion of the loop. This sharing is often referred to as pair gain. An active remote digital terminal (RDT) converts optical signals to electrical signals. Dedicated copper wires are used only in the distribution and drop segments between which segments is located a passive curb pedestal near a group of individual homes or subscriber premises to serve them. No special equipments are needed at the individual homes but the capacity of the copper wires limits the scope of extended services.

The fiber-to-the-curb (FTTC) system in the active double star (ADS) configuration is a further variation of the DLC system and typically uses DLC in the feeder followed by more pair gain electronics for the distribution segment. An RDT may be passive or active. The traditional digital loop carrier-like approach for the FITL is to further place fiber in the distribution segment of the DLC system shown in the Figure. Thus this can be considered as a further evolutional phase from the DLC system. In this case, the RDT is an active terminal forming a DLC system (active optoelectronics). The RDT may now properly be called remote fiber terminal (RFT). Within the DLC system an optical channel unit (OCU) would transmit and receive information from the optical network unit (ONU). The ONU would be located at the curb pedestal near the subscriber premises and contain various service-related interfaces such as POTS, coin, data or video.

The RDT can be a passive terminal. In this case it contains only single mode fiber splices or splitters etc. but it is a junction between the feeder trunk (generally encased and buried) and the distribution (buried, aerial etc.) Other passive optical splitters may be located on the single mode fiber distribution trunk which ends at an active curb pedestal. The curb pedestal contains optoelectronics and converts optical signals to electrical signals. Dedicated copper wires are used for the drop. The services to subscriber premises are again limited but future upgrading will be easier to implement than the DLC system.

The fiber-to-the-home (FTTH) system in the passive optical network (PON) configuration uses the pair gain concept but also uses passive optical splitters to eliminate the electronics and optoelectronics at the curb pedestal as well as at the RFT. The same single mode optical fiber extends the pair gain concept to the drop to subscriber premises. An active optoelectronic terminal is required at each subscriber premise to interface subscriber's data terminal equipment (DTE).

The article by McConnell referred to earlier concludes that using the traditional approach, every ONU supported would require two sets of optoelectronics (one each at the RFT and ONU) and an individual fiber path between the RFT and ONU. The amount of fiber and optoelectronics required using this architecture makes it difficult to achieve cost-parity with copper. The PON architecture, on the other hand, addresses the economic use of deploying FITL systems by sharing fibers and electronics among a number of subscribers. This is accomplished using a time division multiple access (TDMA) protocol that allows the payloads of multiple ONUs to be transmitted over a single pair of fibers. To separate the combined payloads, passive optical splitters are used.

Figure 2:
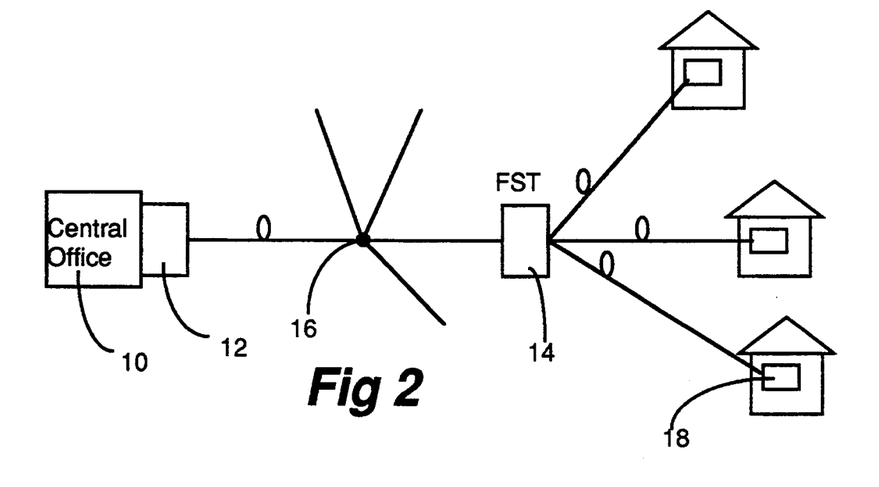
FIG. 2 is a schematic diagram of a novel loop network according to the present invention.

FIG. 2 illustrates the present invention according to one embodiment. In the Figure, a central office 10 contains a remote fiber terminal 12 in its premise instead of being away from the switching equipment. The remote terminal includes all the necessary electronics for optical transmission to curb pedestals 14 which are called fiber service terminals (FSTs) via single mode optic fiber feeder and distribution of e.g. 150 Mb/s. No active equipments are located on the single mode fiber feeder but one or more passive splitters 16 and/or feeder splices can be provided at the junction between the feeder and the distribution or at any point on the distribution segment to accomplish a necessary configuration. The FSTs are active pedestal which contains multiplexer/demultiplexer, optical transmitter/receivers and etc. The drop from the FST to a subscriber premise is a multimode fiber optic e.g. of 40 Mb/s which terminates at a house optical terminal 18 (HOT) located at a subscriber premise. Each FST serves for example 16 HOTs.

Figure 3:
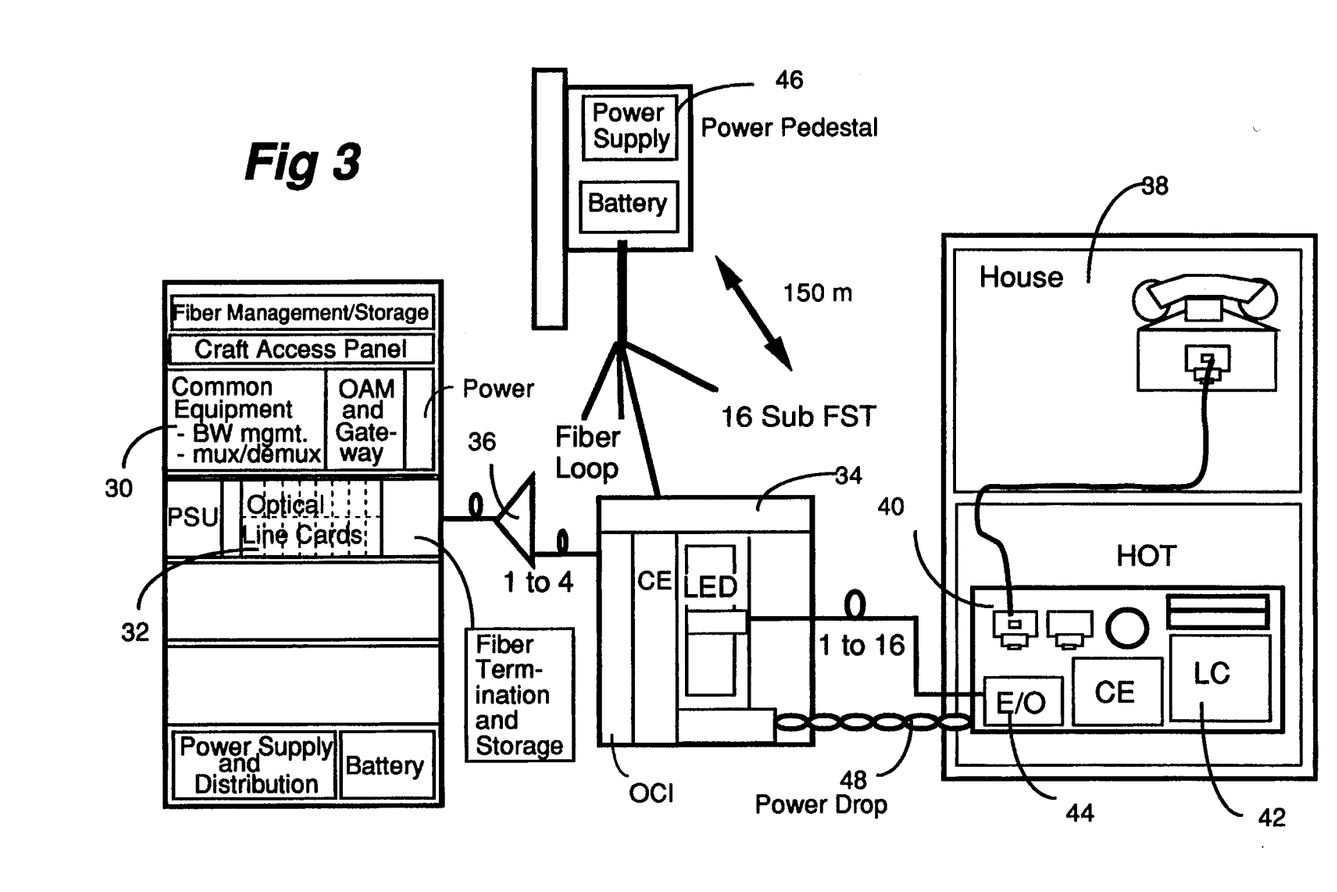
FIG. 3 is a functional diagram of the various components of the loop network.

FIG. 3 is a functional diagram of the present invention. The switching equipment 30 in the central office sends out multiplexed electrical signals. In the direction from the central office to the subscriber premise, the electrical signals are first converted to multiplexed optical signals at the remote fiber terminal (RFT) 32 built in the central office premise and sent to the FST 34 over the single mode optic fiber feeder cable. In some embodiments, in passive splitters 36 (n=1-4) divide the optical signals into each FST. FSTs are located reasonably near the subscriber premises 38, generally at similar locations as curb side pedestal in the known architectures. An FST demultiplexes the optical signals to a plurality of home optical signals and sends them over multimode fiber optic drops to house optical terminals 40 located at subscriber premises. As the FSTs are located near the subscriber premises and multimode fibers can be uninterrupted, conventional copper pedestals and fiber splice pedestals which are required near the premises in the known architectures can be eliminated. Each of the house optical terminals includes an individual line card or cards 42 and an E/O (electric/optic) converter 44 to convert a home optical signal to a home electrical signal. As the FSTs and the house optical terminals are active devices, they require electric power to operate. A power pedestal 46 is provided for this purpose at or near the FST and connects it with the commercial hydro lines. An emergency battery pack is housed in the pedestal. A pair of copper wires 48 between the FST and the subscriber premise supply the needed electrical power to the house optical terminal. A power pedestal may serve one or more FSTs (e.g. 16).

Figure 4:
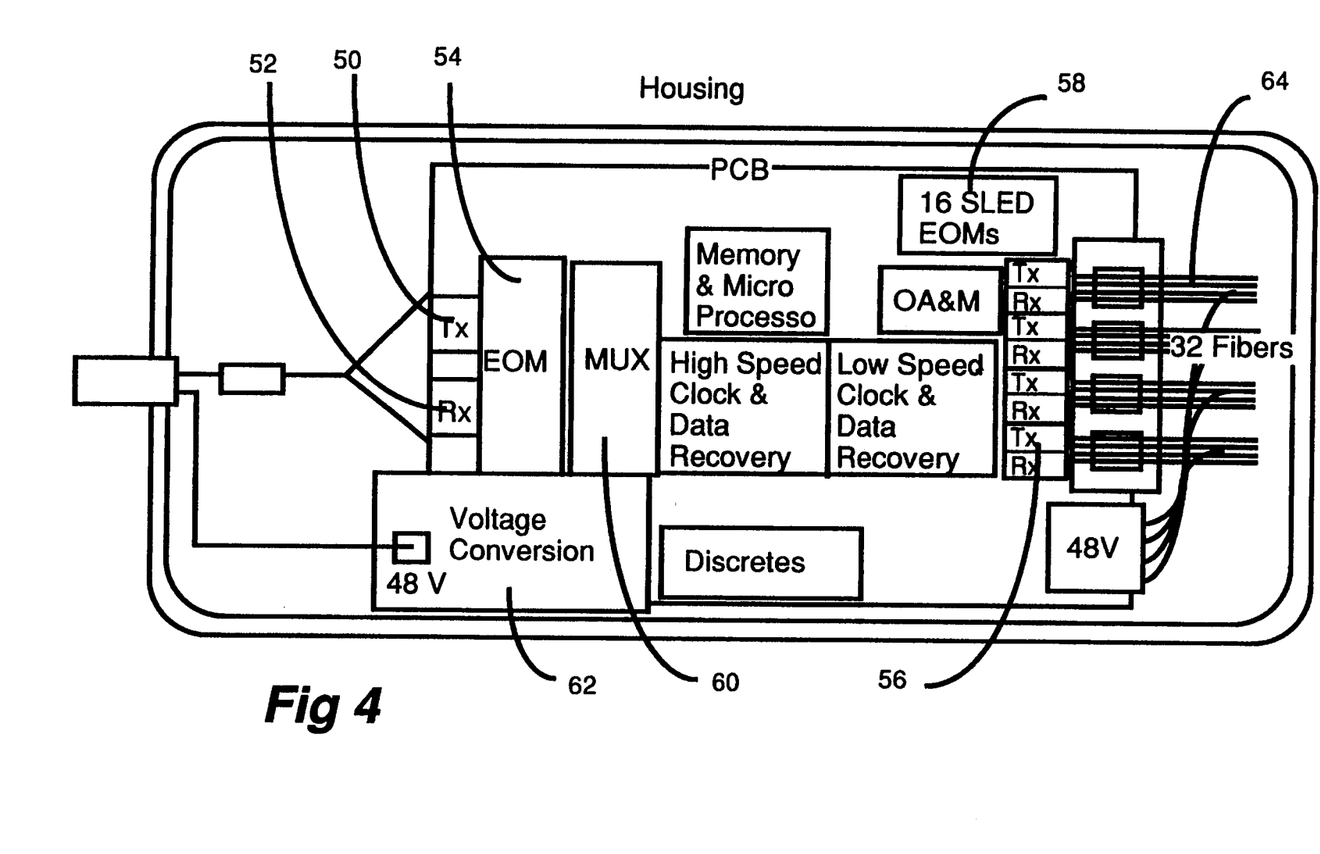
FIG. 4 is a functional diagram of the fiber service terminal according to the invention.

FIG. 4 shows an FST. In the Figure it is shown that an FST includes an optical transmitter 50, an optical receiver 52 and an E/O module 54 on the feeder side. A plurality of optical receivers, transmitters 56 and E/O modules 58 are provided on the drop side and a multiplexer/demultiplexer together 60 with its associated components such as a microprocessor and clock and data recovery circuits interconnect the E/O modules at the both sides. In addition, voltage converter circuits 62 for provisioning the proper power from the hydro lines are also housed in the FST. 16 pairs of multimode optic fibers 64 (32 fibers) serve as drops for 16 subscriber premises. Each pair is provided with an optical transmitter and an optical receiver. Each fiber of a pair is used for transmitting signals in each direction. The optical transmitters use surface LEDs which are optically coupled to each of the drop fibers. In the known architectures, single mode optic fibers are used because they are more efficient in transmitting optical signals due to their low absorption loss. However they require more accurate alignment between the light source and the fiber core. It is generally accepted that a laser source must be used as the light source. It should also be mentioned that a single mode fiber carrying an intense light is not welcome to a subscriber premises where inadvertent handling of the fiber may result in the handlers eye damage. The multimode fibers, on the other hand, have a higher absorption loss but permit the use of other kinds of light sources such as light emitting diodes etc. because they do not require as accurate alignment as the single mode fibers. The surface light emitting diodes (SLED) are less costly than lasers but very acceptable light source for this purpose. In one embodiment, 16 pairs of copper wires are also run along the drops for supplying the power to the house optical terminals.

Figure 5:
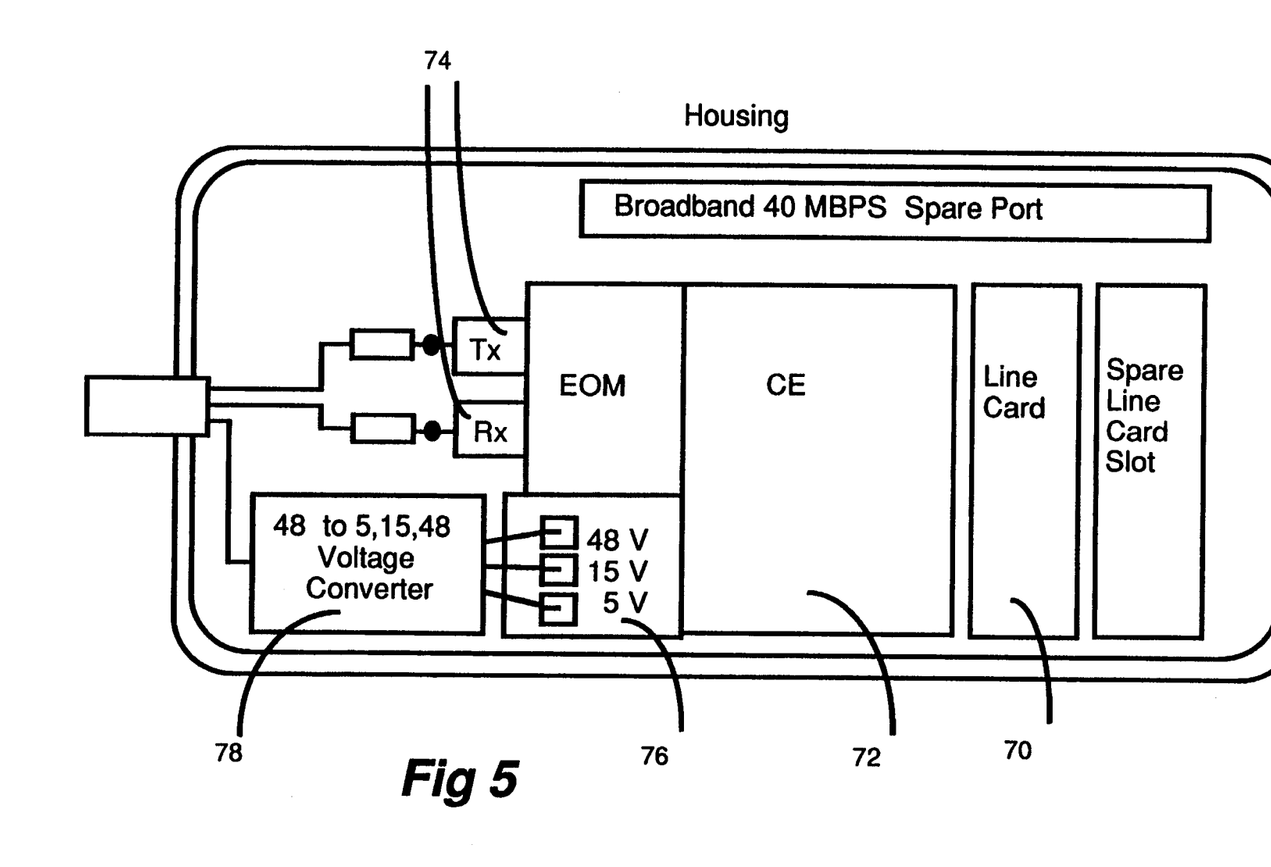
FIG. 5 is a functional diagram of the house optical terminal according to the invention.

In FIG. 5, the house optical terminal is shown to contain a line card 70 which interfaces customer communication terminals with CE 72. An optical transmitter and receiver 74 such as those similar to ones located at FST are attached at the home end of the drop and an E/O module 76 connects the EC and the transmitter/receiver. A voltage converter 78 is included in this terminal for supplying the proper power sent through the power copper wires to the components. In certain embodiment, a drop includes more than one multimode fibers and a HOT contains one or more SLED coupled to the fibers, depending upon the required bandwidth.

Figure 6:
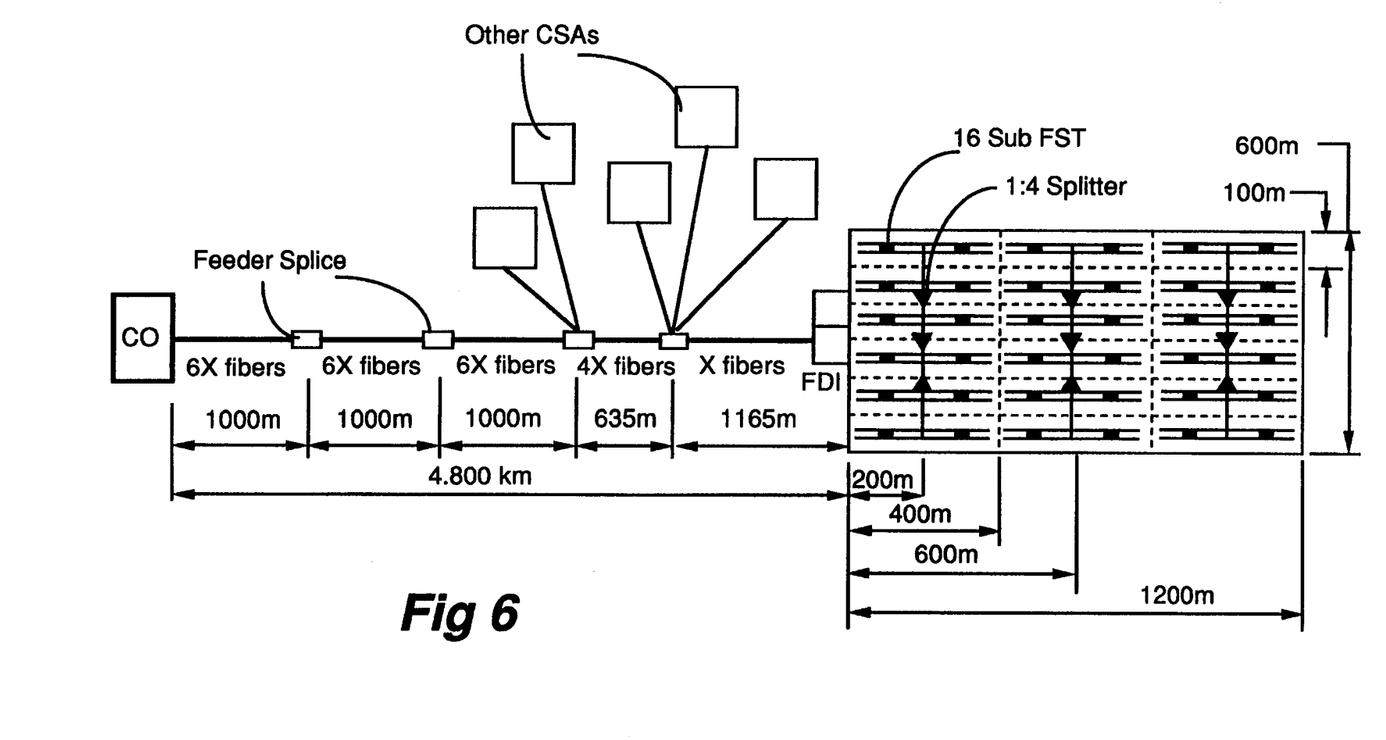
FIG. 6 is a layout showing a configuration of a carrier service area according to the invention.

In FIG. 6, the present invention is applied to a typical subdivision of a residential area. In the telephone environment it is called a carrier serving area (CSA). The figure also illustrates passive feeder splices as well as passive optical splitters from which separate CSAs are branched off. As shown in the Figure, each CSA contains many FST (e.g. 16) and 1:4 splitters. A fiber distribution interface (FDI) at the entrance of the CSA is a passive equipment used as a line management location by the telephone company for repair, upgrading etc. The FDI may in another embodiment integrate a group of passive optical splitters.

According to the present invention, the RFT is integrated into the central office premise and this accomplishes increased fill on peripheral equipment i.e. more lines available to fill shelves, consolidate functionality of transport and access nodes and save cost on outside plant cabinet or CEV (common equipment vault). Small split ratio passive splitters used in the feeder/distribution segment result in reduction of fiber cost in feeder and part of CSA and central office peripheral ports, while the small split ratio will not increase EOM cost for less than 60 Mb/s. FSTs are located within reach of many subscriber premises and regular curb pedestals can be eliminated. Many FSTs sharing a power pedestal lower the cost and increase adaptability for future growth. The FST only contains shared equipment and because of the multimode fibers economical optoelectronics are used. No line cards are housed in the FST and subscriber lines can be installed as they are demanded. The FSTs can thus much be reduced in size. The FST utilization will improve because no line card slot sparing is required for potential further line growth as additional line cards can be much more easily and economically accommodated at the HOT. In combination of FSTs and HOTs fault sectionalization can be more easily achieved. The HOT uses SLED and multimode drop, realizing the broadband capability immediately available for requested customers. However at the same time only one POTS line can be provided to certain homes and additional services can be easily added at very low cost if demanded later using one or more spare line card slots on the HOT.

According to the inventors comparative analyses using generic architecture models, the present invention is more costly in installation than copper wire scheme but is very competitive with the FTTC and PON. However when considered the cumulative cost of future growth for services, the present architecture shows advantages over other FTTC and PON or even over the copper scheme.

Figure 7:
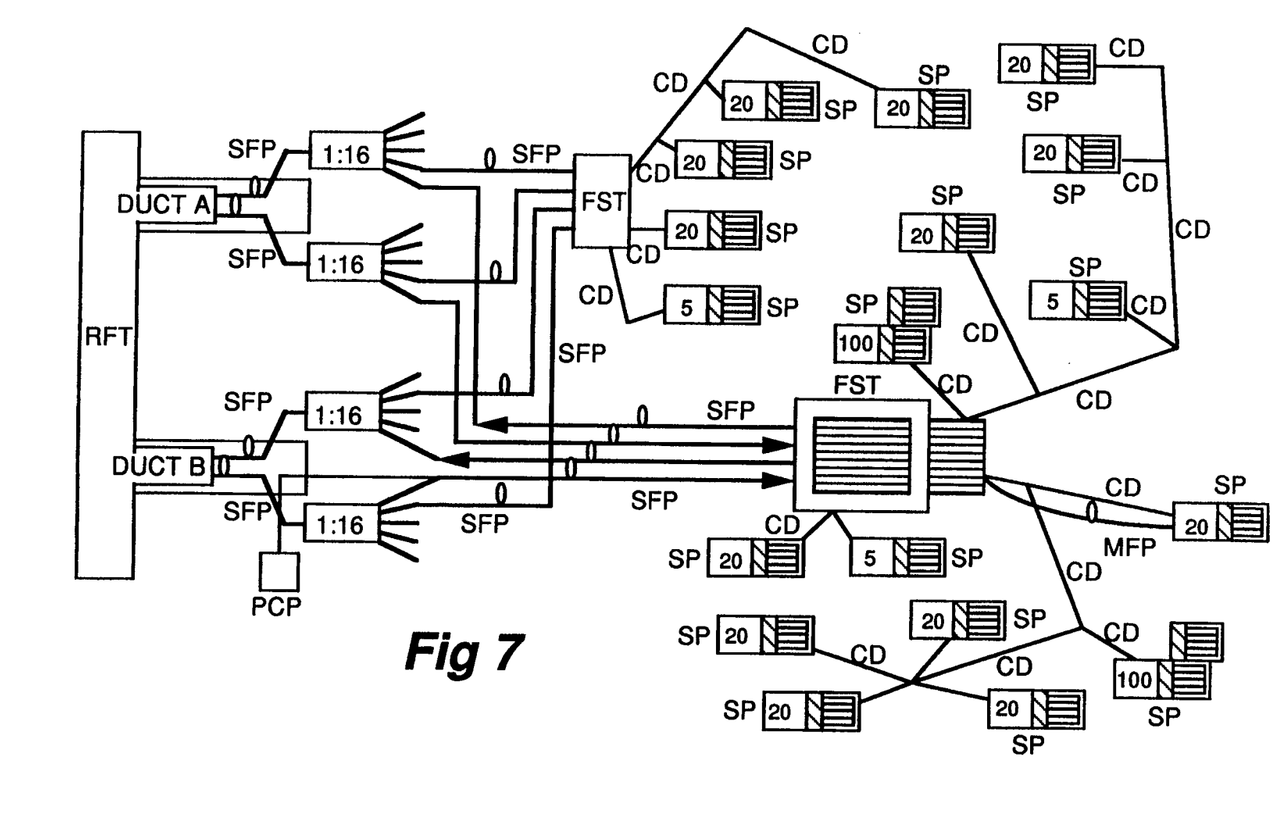
FIG. 7 is a schematic diagram of a telephone loop network according to one embodiment of the invention.

It is important that the telephone loop networks must have a good survivability. FIG. 7 illustrates schematically another embodiment of the present invention. In the Figure, the fiber optic loop network is shown to interconnect a group of subscriber premises (SP) with a remote fiber terminal (RFT) of a central switching office (CSO) (not shown) via a fiber service terminal FST. Each of the premises SP, typically an office building with anything from a few, say 5 or less, subscribers to many, say 110 or more, subscribers is connected to the FST by a pair of multimode optical fibers. To simplify FIG. 7, only one of the multimode fiber pairs (MFP) is shown, the remainder are not shown as such in the Figure. However, the multimode fiber pairs are laid in conventional cable ducts (CD) which are routed round and branched to the group of subscriber premises SP. The ducts are shown as thin lines in FIG. 7, while fibers are shown as thick lines. The FST connects with two remote fiber terminals at the CSO via two pairs of single mode (SFP) fiber laid in two separate cable ducts A, B—one pair in each duct. The FST interfaces with the two single mode fiber pairs such that each pair normally provides only one half of the go and return path to the CSO. Thus one fiber of the pair in duct A will provide the go path associated with the return path provided by one fiber of the pair in duct B and vice versa. The FST includes duplicate transmitter and receiver modules Tx, Rx coupled via a dual Tx/Rx plane switch to a common MUX/DEMUX module. The MUX/DEMUX module couples via a plurality, typical 16, of multimode fiber transmitters and receivers with pairs of multimode fibers (MFP), one pair for each subscriber premise SP. At each subscriber premise there is a line card or cards (not shown) which interface subscriber communication terminals with the multimode fiber pair.

For the FST interface with the single mode fibers the transmitters Tx may require laser drivers, whereas for the interface with the multimode fibers less costly surface light emitting diodes (SLED) will suffice. The SLEDs and their associated receiving photodetectors are incorporated in electro-optic modules (EOM).

Figure 8:
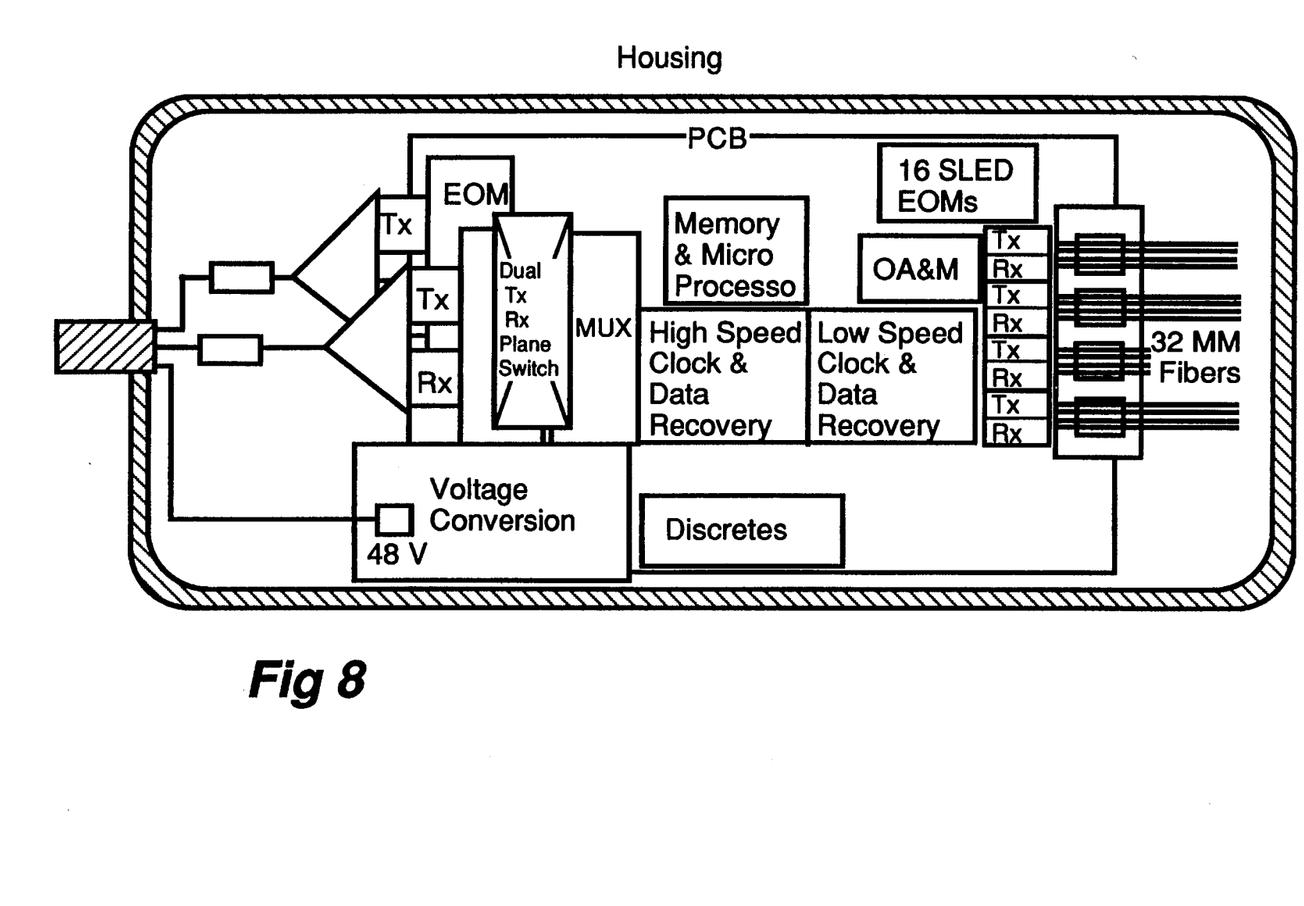
FIG. 8 is a schematic diagram of a fiber service terminal FST according to one embodiment of the invention.

As shown in FIG. 8, the FST contains a memory and microprocessor to control the operation of the FST, a voltage converter to provide power for the FST and the subscriber line interfaces, power being fed via copper conductors laid in the fiber optic ducts and clock and data recovery circuits. In this embodiment the copper conductors are shown by a thin line originating from a power module designated as PCP which may be located near CSO.

In the event of a fault, due to accident or other cause, in one of the single mode fibers, normal operation of the FST and the service to the subscribers of the group should not be affected since the FST processor monitors the network performance and controls the dual Tx/Rx plane switch to reroute the multiplexed optical signals over unaffected fibers. Any faults in the multimode part of the network may affect an individual subscriber or a number of subscribers, depending on the location and type of the fault and the architecture of the multimode fiber network. Since the FSTs extend relatively close to the subscriber and are tree networked onward a break in the tree network will interrupt service to only a small number of subscribers.

In an alternative embodiment of the invention, where there are a number of closely related groups of subscriber premises SP each group having a separate FST the single mode part of the network may incorporate optical n-way splitters and combiners SC, e.g. 1:16, whereby a common single mode fiber connection serves to connect the FSTs of the closely related groups. If relatively low split ratios i.e. 1:4 to 8 is used in the single mode fiber section, a diplexer may be used at the FST to combine Tx/Rx onto one fiber, in which case a one pair of single mode fibers will be sufficient to give the required redundancy.

By providing redundancy only in the (comparatively) long run single mode portion of the network where expense is shared across many subscribers, the cost of effecting a high degree of protection against faults is kept to a minimum, since the electro-optic devices e.g. lasers required for single mode operation are relatively costly compared to those, e.g. SLEDs, needed for multimode operation. To some extent the cost of this protection is increased by the doubling of the single mode fiber cables, routes and transmitter/receivers, but this is acceptable given the savings in utilising multimode fibers and their associated components in the demultiplexed part of the network.

What is claimed is:

1. A cost optimized digital telephone loop network connecting a switch in a central switching office and a plurality of individual subscribers, comprising:
    a) a remote fiber terminal located at the central switching office and including multiplexer/demultiplexer means for converting electrical signals from the switch to multiplexed digital optical signals and vice versa;
    b) between one to sixteen fiber service terminal means, each located substantially near the plurality of subscribers, each of the fiber service terminal means including multiplexer/demultiplexer means for converting the multiplexed optical signals into demultiplexed individual home optical signals and vice versa and a plurality of surface light emitting diodes for transmitting the individual home optical signal to and from the plurality of subscribers;
    c) single mode fiber optic feeder cables connecting the remote fiber terminal and a plurality of fiber service terminal means for transmitting the multiplexed optical signals to the fiber service terminal means;

d) a small number of passive optical splitter/combiner means on any of the single mode fiber optic feeder cables for splitting and combining the multiplexed optical signals to and from the plurality of fiber service terminal means, the split rate of each splitter/combiner means being not more than one-to-four;

e) a plurality of pairs of multimode fiber optic drops, each pair optically connecting one of the fiber service terminal means and one individual subscriber of the plurality of subscribers, by way of the plurality of surface light emitting diodes, one drop within each being for transmitting the demultiplexed individual home optical signal to the individual subscriber and the other drop of the pair being for receiving individual home optical signal from the individual subscriber;

f) house optical terminal means, each located at the individual subscriber and including an individual line card or cards which contain a surface light emitting diode, for converting the demuliplexed individual home optical signals to home electrical signals and vice versa; and g) electrical drops, each connecting a fiber service terminal means and the individual subscriber for supplying the electrical power to its house optical terminal means, wherein the network has for each fiber service terminal means at least two separate single mode feeder cables connecting to respective separate remote fiber terminals at the central switching office, each feeder cable having separate go and return paths, and in each fiber service terminal means interfacing the switch for connecting the multiplexer/demultiplexer means of the fiber service terminal means with one or other of the feeder cables whereby in the event of a fault developing in either feeder cable at least one go and one return path remains effective between the fiber service terminal and the central switching office.

2. The network according to claim 1 wherein each fiber service terminal means includes memory and microprocessor means to monitor network performance and, in the event of a fault in a single mode fiber, to control the switch and reroute the multiplexed digital optical signals over unaffected fibers.

* * * * *